UNITED STATES PATENT OFFICE.

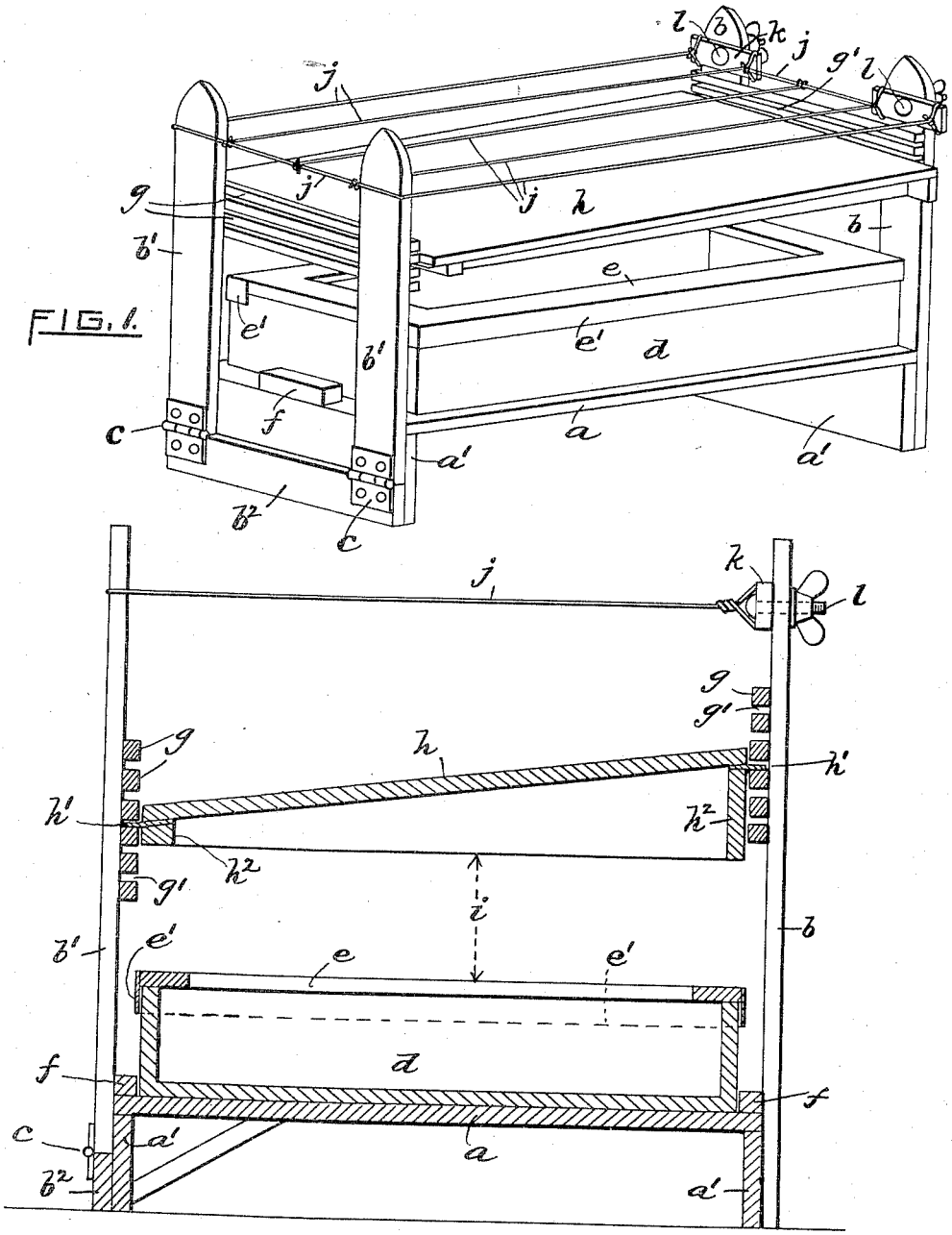

RAYMOND C. SUTTON, OF NORTH ATTLEBORO, MASSACHUSETTS.

FEED-TROUGH FOR POULTRY.

1,078,524. Specification of Letters Patent. Patented Nov. 11, 1913.

Application filed March 14, 1913. Serial No. 754,360.

*To all whom it may concern:*

Be it known that I, RAYMOND C. SUTTON, a citizen of the United States, residing at North Attleboro, in the county of Bristol and State of Massachusetts, have invented certain new and useful Improvements in Feed-Troughs for Poultry, of which the following is a specification.

My invention relates to improvements in feed troughs for poultry and the purpose of my invention is to provide a trough which can be adapted readily to poultry of different ages and sizes, which will have an adjustable roof for the protection of the contents and which will embody a device for preventing the poultry from roosting or lodging upon the same, and which, moreover, is so constructed as to be readily taken apart for purposes of cleaning or disinfecting. I accomplish these purposes by the device shown in the accompanying drawings, in which—

Figure 1 is a perspective of my feed trough and Fig. 2 a vertical section of the same.

The same parts are indicated by the same letters in both views.

In Fig. 1, $a$ is a base mounted upon the supports $a'$—$a'$ and having at each end the posts $b$—$b$—$b'$—$b'$. Upon the base $a$ are the stops $f$—$f$ for the purpose of retaining in position the feed trough proper, $d$, which can be readily slid into the retaining frame from either side. The trough $d$ is provided with a removable top $e$ which has an inwardly projecting margin as shown in both figures, and serves to retain the feed within the trough $d$. The cover $e$ is retained in place upon $d$ by flaps, preferably of metal, $e'$—$e'$.

Each pair of opposite posts $b$—$b$—$b'$—$b'$ is provided with a plurality of spaced strips $g$—$g'$, the strips $g'$ being higher than the strip $g$ so as to give pitch to the roof $h$. This roof $h$ consists of a flat board or piece of metal having projecting therefrom the tongues $h'$—$h'$ by means of which tongues, through the agency of the spaces between the strips $g$—$g'$, the roof $h$ may be shifted or changed in height, thus changing the space $i$ between the top of the feed trough $d$ and the roof $h$. The purpose of changing the distance between $h$ and $d$ is in order to accommodate fowl of different periods of growth from early chickens up to mature hens, the space being such as to permit the head of the fowl to enter and obtain food, but not sufficient to allow the fowl to get bodily into the trough. The posts $b'$—$b'$ are hinged upon the block $b^2$ by means of the hinges $c$—$c$ but are held in place when upright by the wires $j$—$j$—$j$. These wires extend from the posts $b'$—$b'$ over the top of the roof $h$ to the posts $b$—$b$ and there they are held in place by cross pieces $k$ attached to the bolts $l$—$l$, which pierce the posts $b$—$b$ and are provided with nuts upon the outer face of the posts $b$—$b$, for the adjustment of the tension of the wires.

It is well known that articles with which poultry come in contact are liable to become infected with vermin so that it is of great importance with poultry raisers to have every article of this kind of such form that it can be easily taken apart for cleaning purposes or for purposes of disinfection.

It will be seen that the hinged posts $b'$—$b'$ in connection with the wires very greatly facilitate the disassembling of my entire device so that the posts $b$—$b$ may be laid back flatly; the roof $h$ removed, and the trough $d$ with its inwardly projecting shelf $e$ taken entirely apart, so that the whole may be thoroughly fumigated or cleansed. The wires $j$ not only serve the purpose of retaining the entire mechanism in place and making a unit of it, but they serve a further purpose, which is fully as important, of keeping the poultry from roosting upon the top of the board $h$, as chickens or fowl will not light upon wires like those used in my device.

Having now described my invention, what I claim and desire to secure by Letters Patent is:—

1. A feed trough for poultry consisting of a base; a feed box supported thereby; upright posts projecting vertically from each end of said base, the posts at one end being hinged so as to be capable of swinging backward away from said base, and means for securing said posts in position, substantially as described.

2. A feed trough for poultry consisting of a base; a feed box supported thereby; upright posts projecting vertically from each end of said base, the posts at one end being fixed and those at the other end being hinged to said base, said posts having transversely fixed thereon a plurality of spaced strips; a roof adapted to cover said feed box by engagement in the several spaces between said spaced strips, and a plurality of wires arranged in a horizontal plane between and fixed to said posts above said roof, substantially as set forth.

3. A feed trough for poultry consisting of a base; a feed box supported thereby; upright posts projecting vertically from each end of said base, the posts at one end being hinged so as to be capable of swinging backward away from said base; a plurality of wires uniting the upper portion of said hinged posts with the upper portion of the posts at the opposite end of said trough; and bolts connected with said wires and passing through the posts at one end of said trough and operating to adjust the tension of said wires, substantially as set forth.

In testimony whereof I affix my signature in presence of two witnesses.

RAYMOND C. SUTTON.

Witnesses:
 ROSCOE M. DEXTER,
 EDITH M. BROMLEY.

Copies of this patent may be obtained for five cents each, by addressing the "Commissioner of Patents, Washington, D. C."